(12) United States Patent
Lai et al.

(10) Patent No.: US 10,733,385 B2
(45) Date of Patent: Aug. 4, 2020

(54) BEHAVIOR INFERENCE MODEL BUILDING APPARATUS AND BEHAVIOR INFERENCE MODEL BUILDING METHOD THEREOF

(71) Applicant: Institute For Information Industry, Taipei (TW)

(72) Inventors: Chia-Min Lai, New Taipei (TW); Chia-Yu Lu, Taipei (TW)

(73) Assignee: Institute For Information Industry, Taipei (TW)

( * ) Notice: Subject to any disclaimer, the term of this patent is extended or adjusted under 35 U.S.C. 154(b) by 336 days.

(21) Appl. No.: 15/839,787

(22) Filed: Dec. 12, 2017

(65) Prior Publication Data

US 2019/0179906 A1 Jun. 13, 2019

(51) Int. Cl.
| | | |
|---|---|---|
| G06F 40/40 | (2020.01) | |
| G06F 21/56 | (2013.01) | |
| G06K 9/72 | (2006.01) | |
| G06K 9/62 | (2006.01) | |
| G06F 40/30 | (2020.01) | |
| G06F 40/279 | (2020.01) | |

(52) U.S. Cl.
CPC .......... G06F 40/40 (2020.01); G06F 21/566 (2013.01); G06F 40/279 (2020.01); G06F 40/30 (2020.01); G06K 9/6268 (2013.01); G06K 9/72 (2013.01)

(58) Field of Classification Search
CPC .... G06F 17/2785; G06F 17/28; G06F 21/566; G06F 21/56; G06F 17/2765; G06F 40/40; G06F 40/30; G06F 40/279; G06K 9/6271; G06K 9/72; G06K 9/6268; G06K 9/6262

USPC .......................................................... 726/24
See application file for complete search history.

(56) References Cited

U.S. PATENT DOCUMENTS

| | | | |
|---|---|---|---|
| 9,705,904 | B1 | 7/2017 | Davis et al. |
| 2016/0329044 | A1 | 11/2016 | Cao et al. |
| 2017/0262633 | A1 | 9/2017 | Miserendino et al. |
| 2017/0308613 | A1 | 10/2017 | Zhu et al. |
| 2018/0314932 | A1* | 11/2018 | Schwartz et al. |
| 2019/0114348 | A1* | 4/2019 | Gao et al. |

(Continued)

OTHER PUBLICATIONS

The extended European Search Report rendered by the European Patent Office for European Patent Application No. 17206750.6, dated May 30, 2018, 9 pages.

(Continued)

*Primary Examiner* — Kambiz Zand
*Assistant Examiner* — Benjamin A Kaplan
(74) *Attorney, Agent, or Firm* — Skaar Ulbrich Macari, P.A.

(57) ABSTRACT

A behavior inference model building apparatus and a behavior inference model building method thereof are provided. The behavior inference model building apparatus converts a plurality of program operation sequences of a plurality of program operation sequence data into a plurality of word vectors through a word embedding model, and inputs the first M word vectors of the word vectors, corresponding to each program operation sequence data, into a generative adversarial network (GAN) model to train and optimize the GAN model. The behavior inference model building apparatus integrates the word embedding model and the generator of the optimized GAN model to build a behavior inference model.

20 Claims, 7 Drawing Sheets

(56) References Cited

U.S. PATENT DOCUMENTS

2019/0147343 A1* 5/2019 Lev et al.

OTHER PUBLICATIONS

Kolter, Jeremy Z., et al., "Learning to Detect Malicious Executables in the Wild", KDD '04-Proceedings of the tenth ACM SIGKDD International Conference on Knowledge Discovery and Data Mining, Aug. 22, 2004, pp. 470-478, 9 pages.
Awad, Yara et al., "Modeling Malware as a Language", Project Poster, Jan. 1, 2017, 1 page.
Nagano, Yuta, et al., "Static Analysis with Paragraph Vector for Malware Detection", Proceedings of the 11th International Conference on Ubiquitous Information Management and Communication, IMCOM '17, Jan. 5, 2017, pp. 1-7, 7 pages.
The extended European Search Report rendered by the European Patent Office for European Patent Application No. 17206738.1, dated Jun. 20, 2018, 11 pages.
Weiwei Hu, Ying Tan; "Generating Adversarial Malware Examples for Black-Box Attacks Based on GAN"; URL:https://arxiv.org/pdf/1702.05983.pdf; Feb. 20, 2017; 7 pages.
Kunfeng Wang et al.; "Generative Adversarial Networks: Introduction and Outlook"; IEEE/CAA Journal of Automatica Sinica; vol. 4, No. 4; Sep. 15, 2017; pp. 588-598; 11 pages.

* cited by examiner

BEHAVIOR INFERENCE MODEL BUILDING APPARATUS AND BEHAVIOR INFERENCE MODEL BUILDING METHOD THEREOF

FIELD

The present invention relates to a behavior inference model building apparatus and a behavior inference model building method thereof. Specifically, the behavior inference model building apparatus of the present invention builds a behavior inference model based on a word embedding model and a generator of the optimized generative adversarial network model.

BACKGROUND

With the development of science and technology, users can obtain various applications from the Internet. Some applications may destroy the user's computer system during execution, causing the files in the computer be damaged or the user's personal information be stolen.

At present, the detection mechanism of malware mainly utilizes the signature-based comparison to determine whether the application is a malicious program and defends against attacks of these malicious programs. However, the detection mechanism of signature-based comparison can only detect the malicious programs based on the known sample features, and need to extract a certain number of features during the execution of the application to have the opportunity to determine whether the application being executed currently is malicious program. In this case, when a malicious program is detected, the malicious program may have damaged the file on the computer or have stolen the user's personal information.

In view of the above, how to establish a behavior inference model which can accurately infer the follow-up program operations in the early execution period of the application to prevent the computer file from being damaged or prevent the user's personal information from being stolen is an urgent needed for the industry.

SUMMARY

Certain embodiments relate to a behavior inference model that can accurately infer subsequent program operations in the early execution period of an application to reliably prevent the files in the computer from being damaged or prevent the user's personal information from being stolen.

The disclosure includes a behavior inference model building apparatus comprising a storage and a processor. The storage is configured to store a plurality of program operations sequence data. Each of the program operation sequence data records a plurality of program operation sequences. The processor is electrically connected to the storage and is configured to execute the following steps of: (a) convening the program operation sequences of each of the program operation sequence data into a plurality of word vectors through a word embedding model; (b) retrieving, for each of the program operation sequence data, first M word vectors of the word vectors as M input vectors of a Generative Adversarial Network (GAN) model, M being a positive integer; (c) generating, for each of the program operation sequence data, a plurality of inference word vectors by computing the M input vectors through a generator of the GAN model; (d) performing, for each of the program operation sequence data, a real/fake discrimination between the word vectors and the inference word vectors through a discriminator of the GAN model; (e) backpropagating a discrimination result of the real/fake discrimination to the generator to adjust a parameter setting of the generator: (f) repeating the step (c) to the step (e) to train the GAN model to optimize the GAN model; and (g) integrating the word embedding model and the generator of the optimized GAN model to build a behavior inference model.

The disclosure also includes a behavior inference model building method for a behavior inference model building apparatus. The behavior inference model building apparatus comprises a storage and a processor. The storage stores a plurality of program operation sequence data. Each of the program operation sequence data records a plurality of program sequences. The behavior inference model building method is executed by the processor and comprises the following steps of: (a) converting the program operation sequences of the program operation sequence data into a plurality of word vectors through a word embedding model; (b) retrieving, for each program operation sequence data, first M word vectors of the word vectors as M input vectors of a Generative Adversarial Network (GAN) model, M being a positive integer, (c) generating, for each of the program operation sequence data, a plurality of inference word vectors by computing the M input vectors through a generator of the GAN model; (d) performing, for each of the program operation sequence data, a real/fake discrimination between the word vectors and the inference word vectors through a discriminator of the GAN model; (e) backpropagating a discrimination result of the real/fake discrimination to the generator to adjust a parameter setting of the generator; (f) repeating the step (c) to the step (e) to train the GAN model to optimize the GAN model; and (g) integrating the word embedding model and the generator of the optimized GAN model to build a behavior inference model.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or implementations described in these example embodiments.

Therefore, description of these example embodiments is only for purpose of illustration rather than to limit the scope of the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
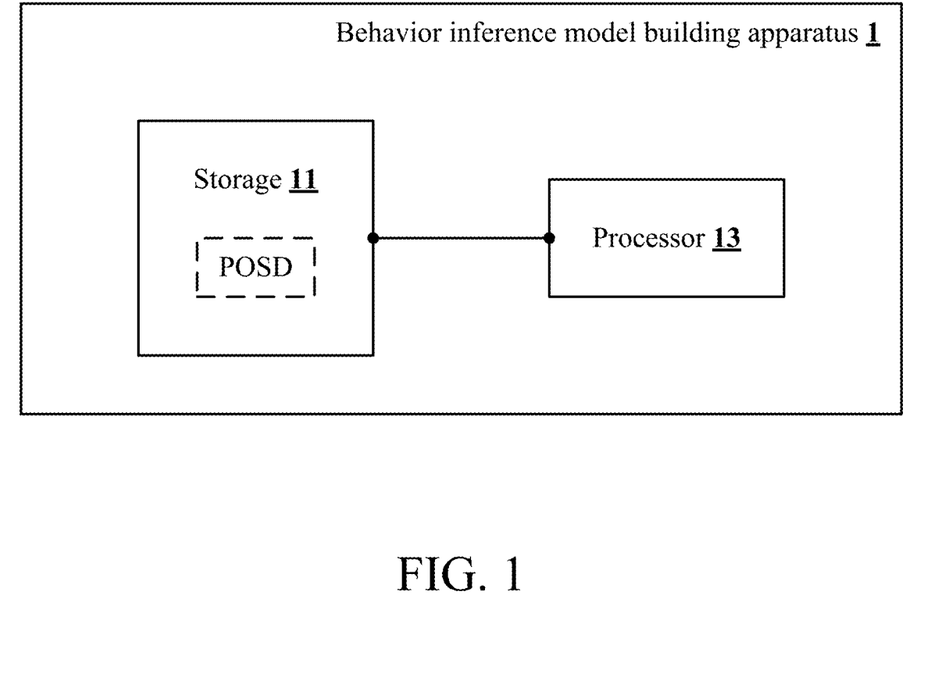
FIG. 1 is a schematic view of a behavior inference model building apparatus 1 according to the present invention.
Figure 2:
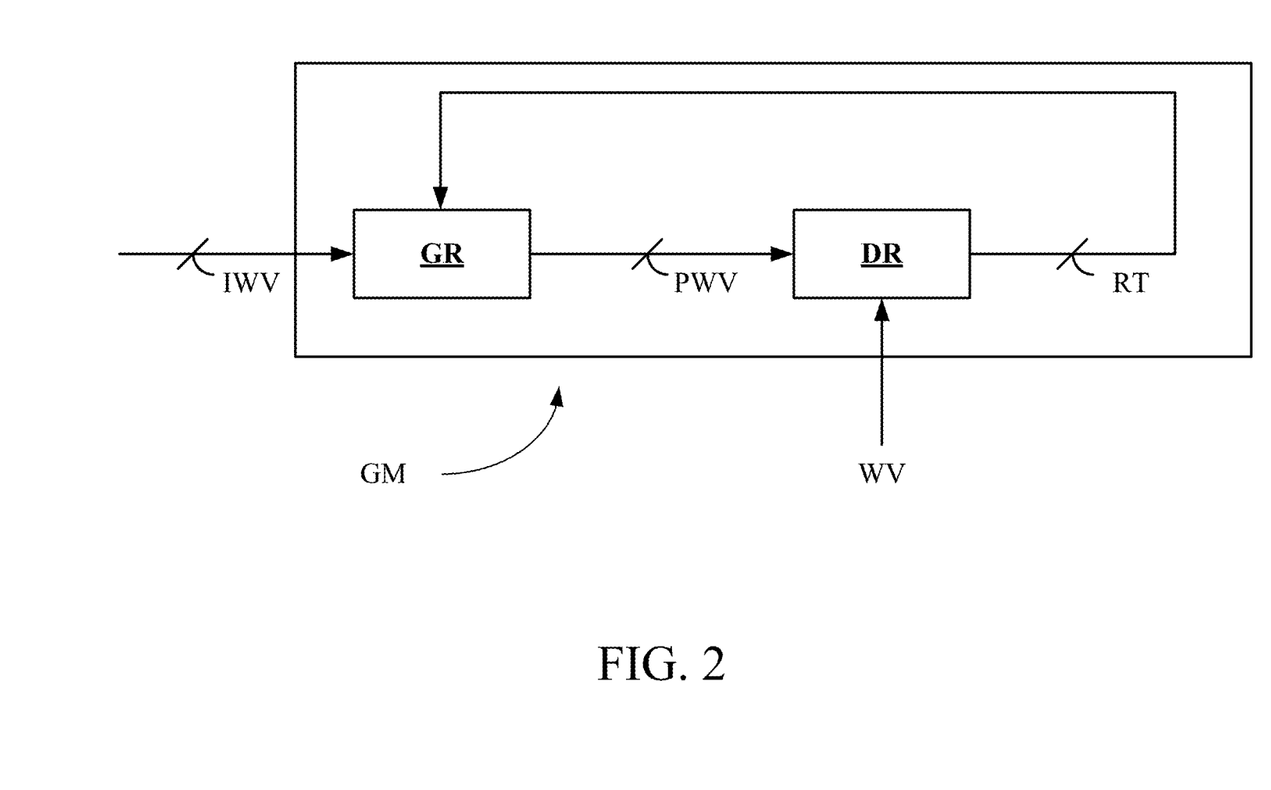
FIG. 2 is a schematic view of a generative adversarial network.
Figure 3:
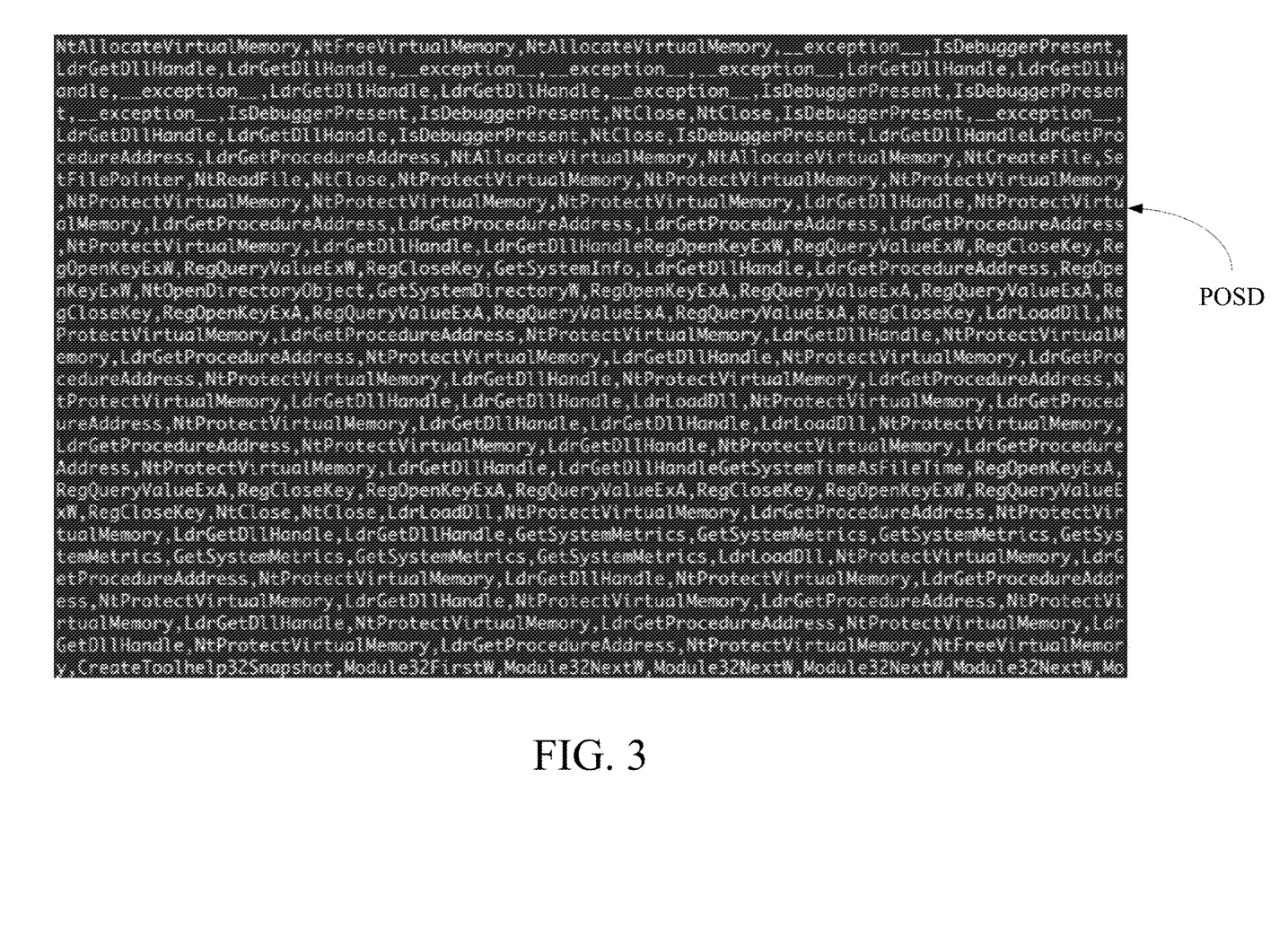
FIG. 3 is a schematic view of a program operation sequence data.

The first embodiment of the present invention is shown in FIGS. 1-3. FIG. 1 is a schematic view of a behavior inference model building apparatus 1 according to the present invention. The behavior inference model building apparatus 1 comprises a storage 11 and a processor 13. The processor 13 is electrically connected to the storage 11. The storage 11 is configured to store a plurality of program operation sequence data POSD. Each of the program operation sequence data POSD records a plurality of program operation sequences. For example, the program operation sequences may be a dynamic program operation sequence, such as an Application Programming Interface (API) sequence or a system call sequence, but is not limited thereto.

The processor 13 converts the program operation sequences of each of the program operations sequence data POSD into a plurality of word vectors WV through a word embedding model. The word embedding model may, for example, be a Word-to-Vector (Word2Vec) model or a One-Hot Encoding model. Subsequently, as shown in FIG. 2, for each of the program operation sequence data POSD, the processor 13 retrieves the first M word vectors of the word vectors WV as M input vector IWV of a Generative Adversarial Network (GAN) model GM, where M is a positive integer. It should be noted that the value of M can be set by the developer based on the type of dynamic program operation sequence to determine the number of word vectors that are input to the GAN model GM as a basis for inference.

Taking the API sequence as an example, the processor 13 may retrieve 100 API sequences of an executing application program through a tracking program and store them as a program operation sequence datum POSD, as shown in FIG. 3. It should be noted that based on the layout restrictions, the API sequences shown in FIG. 3 is only parts of the program operation sequence datum POSD. Subsequently, as described above, for each of the program operation sequence data POSD, the processor 13 converts 100 API sequences in the program operation sequence data POSD into 100 word vectors WV through the word embedding model. Next, for each of the program operation sequence data POSD, the processor 13 takes the first 20 word vectors of the 100 word vectors WV as the input vectors IWV of the GAN model GM.

Referring to FIG. 2, the processor 13 computes the M input vectors IWV for each of the program operation sequence data POSD through a generator GR of the GAN model GM to generate a plurality of inference word vectors PWV. The number of inference word vectors PWV is the same as the number of the word vectors WV (e.g., 100); however, this number can also be set by the developer based on the type of dynamic program operation sequence. For each of the program operation sequence data POSD, the processor 13 performs a real/fake discrimination between the word vectors WV and the inference word vectors PWV through a discriminator DR of the GAN model GM. Then, the processor 13 backpropogates a discrimination result RT of the real/fake discrimination back to the generator GR to adjust a parameter setting of the generator GR.

After the parameter setting of the generator GR is adjusted, for each of the program operation sequence data POSD, the processor 13 will re-compute the input word vectors IWV to generate a plurality of new inference word vectors PWV, perform the real/fake discrimination through the discriminator DR and backpropogate the discrimination result RT to the generator GR. By repeatedly performing the aforementioned steps (i.e., generating the inference word vector PWV, performing the real/fake discrimination, backpropogating the discrimination result RT, and adjusting the parameter setting of the generator GR), the processor 13 trains the GAN model GM to optimize the GAN model GM, and finally integrates the word embedding model and the generator GR of the optimized GAN model GM to generate the behavior inference model.

Based on the foregoing description, it is understood by those of ordinary skill in the art that the similarity between the inference word vectors PWV (i.e., the simulated word vectors) generated by the generator GR after adjusting the parameter settings and the word vectors WV (i.e., the real word vectors) will be higher and higher generally, and the discriminator DR also adjusts the setting of related parameters for discrimination according to the inference word vectors PWV generated by the generator GR and the discrimination result RT. Therefore, as the generator GR and the discriminator DR compete against each other, the optimization training of the GAN model GM will be achieved once it is hard for the discriminator DR to decide the real/fake between the inference word vector PWV and the word vector WV of each of the program operation sequence data POSD.

For example, the objective function for optimizing the generator GR can be represented as the following equation:

$$\frac{1}{m}\sum_{1}^{m} \log(1 - D(G(z)))$$

where m represents the total number of program operation sequence data POSD, z represents M input vectors IWV, G(z) represents the inference word vectors PWV generated by the generator GR, D(G(z)) represents the probability that the discriminator DR determines the inference word vectors PWV are real.

In addition, the objective function for optimizing the discriminator GR can be represented as the following equation:

$$\frac{1}{m}\sum_{1}^{m} [\log D(X) + \log(1 - D(G(z)))]$$

where m represents the total number of program operation sequence data POSD, X represents the word vectors WV corresponding to each of the program operation sequence data POSD, D(X) represents the probability that the discriminator DR determines the word vectors WV are real, z represents the M input vectors IWV, G(z) represents the inference word vectors PWV generated by the generator GR, D(G(z)) represents the probability that the discriminator DR determines the inference word vectors PWV are real.

Unlike the conventional GAN model in the prior art which randomly generates vectors and input the vectors into the generator GR, the present invention inputs the first M word vectors of the program operation sequence data POSD into the generator GR of the GAN model. Therefore, the present invention trains the GAN model which can be used for behavior inference to predict program operation sequences that have not been generated yet. Since those of ordinary skill in the art can understand the details of training the GAN model based on the foregoing description, the details will not be further described herein again.

As mentioned above, the program operations sequence retrieved by the present invention may be dynamic program operation sequence. Therefore, those of ordinary skill in the art understand that the behavior inference model building apparatus of the present invention can build the behavior inference model for any specific program operation sequences, such as the program operation sequences are retrieved by the program operation the tracking program or recorded by the operating system itself through monitoring the program being executed. In other words, the method for building a behavior inference model of the present invention is applied to any program operation sequences which are generated when a terminal device executes a program. For example, the program operation sequence data POSD may include a plurality of abnormal program operation sequence data, and each of the abnormal program operation sequence data is associated with a malicious program. As another example, the program operation sequence data POSD may be a log file generated by the operation system when monitoring the program being executed.

In addition, the behavior reference model generated by the present invention can be compiled into an executable program, run in an operation system, and cooperate with an abnormal behavior detection program. Accordingly, the behavior inference model of the present invention can infer the subsequent program operation sequences based on the first several program operation sequences in the early execution period of the program, and provide the inferred program operation sequences to the abnormal behavior detection program to determine whether an abnormal behavior exists. For example, the abnormal behavior detection program may be an antivirus program. The behavior inference model of the present invention infers program operation sequences of a program that has just been executed and provides them to the antivirus program to determine whether the program is a malicious program.

Figure 4:
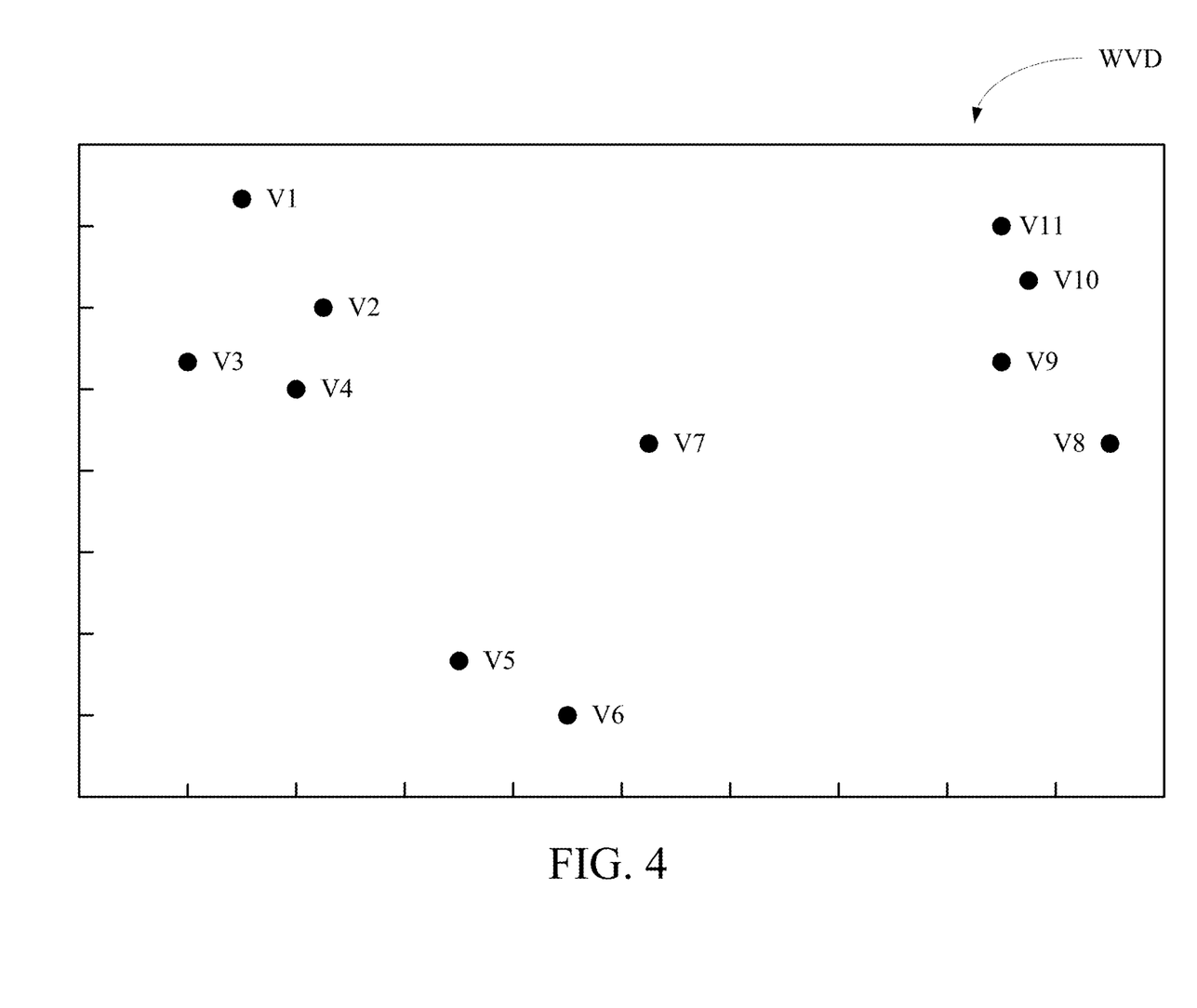
FIG. 4 depicts the distribution of each word vector in a two-dimensional space.
Figure 5:
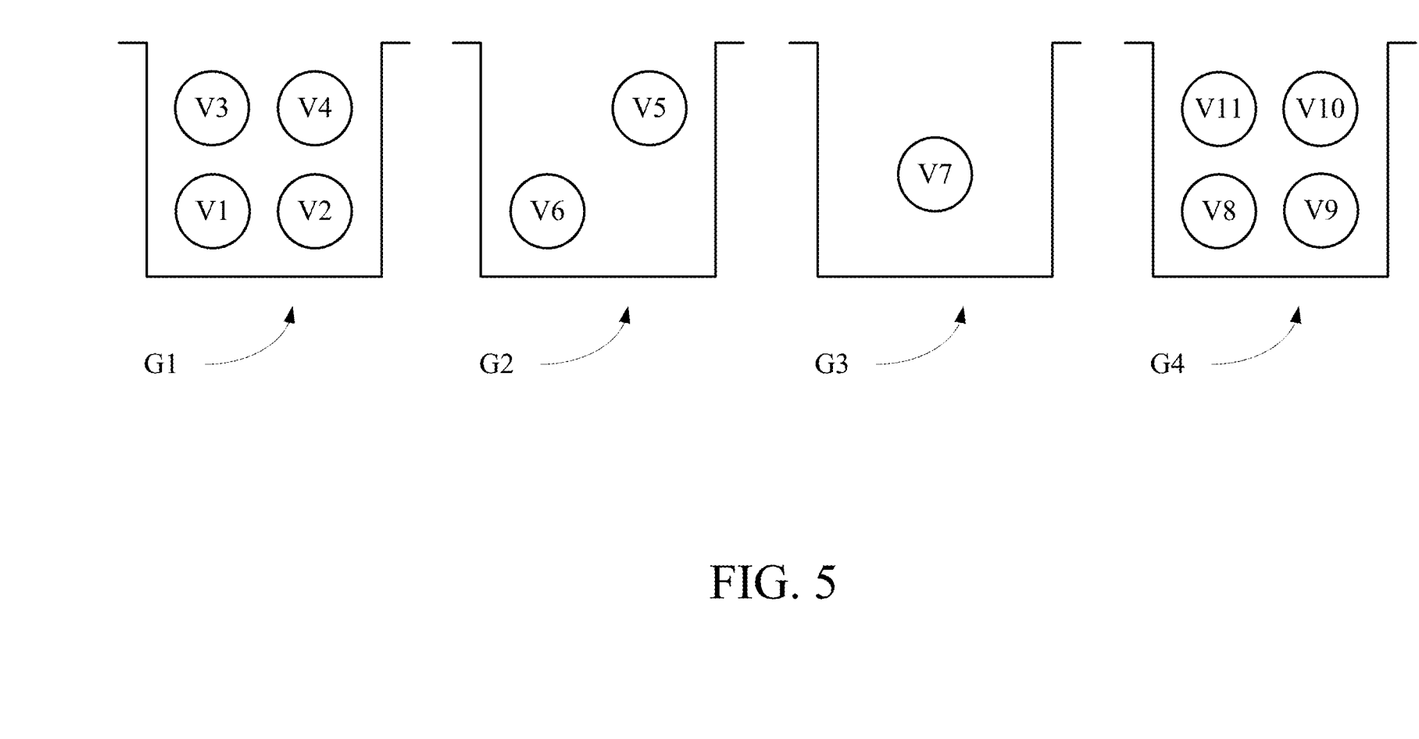
FIG. 5 depicts each word vector group after clustering.

A second embodiment of the present invention is shown in FIGS. 3-5. The second embodiment is an extension of the first embodiment. In this embodiment, the storage 11 further stores a plurality of behavior labels (not shown). Each of the program operation sequence data corresponding to one of the behavior labels. The behavior labels, for example, may be a normal behavior label, an abnormal behavior label, etc., but not limited thereto. In an embodiment, the program operation sequence data POSD includes a plurality of abnormal program operation sequence data, and each of the abnormal program operation sequence data is associated with a malicious program. In this case, the behavior labels may further include an Adware program, a Worm program, a Trojan program, etc., but are not limited thereto.

As described in the first embodiment, the processor 13 converts the program operation sequences of each of the program operation sequence data POSD into a plurality of word vectors WV through a word embedding model. In this embodiment, the processor 13 further clusters the word vectors WV of the program operation sequence data POSD into a plurality of word vector groups based on a clustering algorithm, and compares the program operation sequences of each of the program operation sequence data POSD severally with at least one of the program operation sequences corresponding to at least one of the word vectors included in each of the word vector groups to generate a feature vector of each of the program operation sequence data.

Take the API sequence as an example, the program operation sequence includes "GetSystemInfo", "GetFileSize", "GetSystemDirectoryW", "GetSystemMetrics", "RegQueryValueExA", "RegOpenKeyExA", "LdrLoadDll". "NtCreatFile", "NtReadfile", "NtClose", "NtOpenDirectoryObject", the processor 13 computes the program operation sequences through the word embedding model and generates the word vectors V1-V11 corresponding to the program operation sequences, respectively. Here, it is assumed that the word vector V1 corresponds to "GetSystemInfo", the word vector V2 corresponds to "GetFileSize", the word vector V3 corresponds to "GetSystemDirectoryW", the word vector V4 corresponds to "GetSystemMetrics", the word vector V5 corresponds to "RegQueryValueExA", the word vector V6 corresponds to "RegOpenKeyExA", the word vector V7 corresponds to "LdrLoadDll", the word vector V8 corresponds to "NtCreatFile", the word vector V9 corresponds to "NtReadfile", the word vector V10 corresponds to "NtClose", the word vector V11 corresponds to "NtOpenDirectoryObject".

FIG. 4 shows the word vectors V1-V11 in a word vector distribution space WVD. It should be noted that, in order to simplify the explanation, the word vector distribution space WVD in this embodiment represents the distribution of the word vectors in a two-dimensional space. However, in practice, according to the type of program operation sequence data, developers can decide on the dimension of the word vector distribution space WVD. Since those of ordinary skill in the art can know how to set the spatial dimension of the output, it will not be further described here.

In the word vector distribution space WVD, the word vectors whose positions are close have the similar part of speech or semantic meaning. Therefore, the present invention clusters these word vectors according to a clustering algorithm of unsupervised learning as a basis for subsequently retrieving features of each of the program operation sequence data POSD. In the present invention, the clustering algorithm may be one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm, but not limited thereto.

For example, the processor 13 clusters the word vectors into four word vector groups G1-G4 according to the AP clustering algorithm, as shown in FIG. 5. The word vector group G1 includes the word vectors V1-V4, the word vector group G2 includes the word vectors V5-V6, the word vector group G3 includes the word vectors V7, and the word vector group G4 includes the word vectors V8-V11. It should be note that the number of word vector groups can be determined by the developer himself/herself by setting the parameters of the clustering algorithm (e.g., directly setting the number of required groups, or setting the number of iterations performed by the clustering algorithm). Since the detailed operation of clustering based on the clustering algorithm can be understood by those of ordinary skill in the art, it will not be further described here.

After obtaining the word vector groups, the processor 13 severally compares the program operation sequences of the program operation sequence data POSD with at least one program operation sequence corresponding to at least one word vectors included in each word vector group to generate a feature vector of each of the program operation sequence data POSD. For example, it is assumed that in a program operation sequence data POSD, there are program operation sequences corresponding to the word vector V2, the word vector V6, the word vector V8 and the word vector V11. Thus, for this program operation sequence data POSD, the feature value of the word vector group G1 is 1, the feature value of the word vector group G2 is 1, the feature value of the word vector group G3 is 0, and the feature value of the word vector group G4 is 2, so the feature vector of the program operation sequence data POSD is (1,1,0,2). For another example, it is assumed that in another program operation sequence data POSD, there are program operation sequences corresponding to the word vector V1, the word vector V2, the word vector V4, the word vector V5, the word vector V7, the word vector V9, and the word vector V10. Thus, for the another program operation sequence data POSD, the feature value of the word vector group G1 is 3, the feature value of the word vector group G2 is 1, the feature value of the word vector group G3 is 1, and the feature vector of the word vector group G4 is 2, so the feature vector of the another program operation sequence data POSD is (3,1,1,2).

It should be noted that the aforementioned comparison for generating the feature vectors is implemented based on whether each of the program operation sequence data POSD has the at least one program operation sequence corresponding to at least one the word vector included in each word vector group. However, in other embodiments, the comparison for generating the feature vectors may also be implemented based on how many at least one program operation sequence corresponding to at least one at least one the word vector included in each word vector group in each of the program operation sequence data POSD. For example, it is assumed that there are five program operation sequences corresponding to the word vectors V2, three program operation sequences corresponding to the word vectors V6, one program operation sequence corresponding to the word vectors V8, and three program operations sequences corresponding to the word vector V11 in a program operation sequence data POSD. Thus, for this program operation sequence datum POSD, the feature value of the word vector group G1 is 5, the feature value of the word vector group G2 is 3, the feature value of the word vector group G3 is 0, and the feature value of the word vector group G4 is 4, so the feature vector of the program operation sequence datum POSD is (5, 3, 0, 4).

After generating the feature vectors of each of the program operation sequence data POSD, the processor 13 performs a supervised learning of a classification algorithm to generate a classifier for classifying the feature vectors to correspond to the behavior labels, according to the feature vectors and the behavior labels. For example, the classification algorithm may be one of a Support Vector Machine (SVM) algorithm, a Decision Tree (DT) algorithm, a Bayes algorithm, and a Nearest Neighbors (NN) algorithm, but it is not limited thereto.

The foregoing supervised learning is performed in order to classify the feature vectors into the appropriate categories through the classification algorithm so as to correspond to the behavior labels. For example, the program operation sequence data POSD corresponding to the malicious advertisement program label can be reliably classified into the same category, the program operation sequence data POSD corresponding to the worm program label can be reliably classified into the same category, the program operation sequence data POSD corresponding to the Trojan label can be reliably classified into the same category, and the program operation sequence data POSD corresponding to the normal behavior label can be reliably classified into the same category.

Finally, the processor 13 builds an abnormal behavior detection model according to the word vector groups and the classifier. Therefore, the processor 13 may further integrate the abnormal behavior detection model, the word embedding model and the generator GR of the optimized GAN model to build the behavior inference model. In this way, the behavior inference model of the present invention can predict the program operation that have not been executed yet by inferring the word vectors of the program operation sequences that have not been generated according to the word vectors of the first several program operation sequences, and detect an abnormal behavior based on the program operation sequences of the inferred word vectors to prevent the files on the computer from damaging or prevent the user's personal information from stealing.

In other embodiments, after building the abnormal behavior detection model, the processor 13 may test the abnormal behavior detection model according to a plurality of test program operation sequence data. Based on a detection rate, the processor 13 determines the accuracy rate of the abnormal behavior detection model identifies the test program operation sequence data so that the developer can re-perform the foregoing training to build an abnormal behavior detection model by adjusting related parameter settings of the word embedding model, the clustering algorithm and the classification algorithm according to the accuracy rate. Accordingly, the present invention can build different abnormal behavior detection models for different types of program operation sequence data through the foregoing operation, so as to detect abnormal behavior of various dynamic program operation sequences or static program operation sequences. Similarly, the behavior inference model built by the present invention can be compiled into an executable program and run on an operating system to provide the operating system to detect abnormal behaviors (e.g., detecting malware, detecting illegal operations, etc.).

Figure 6:
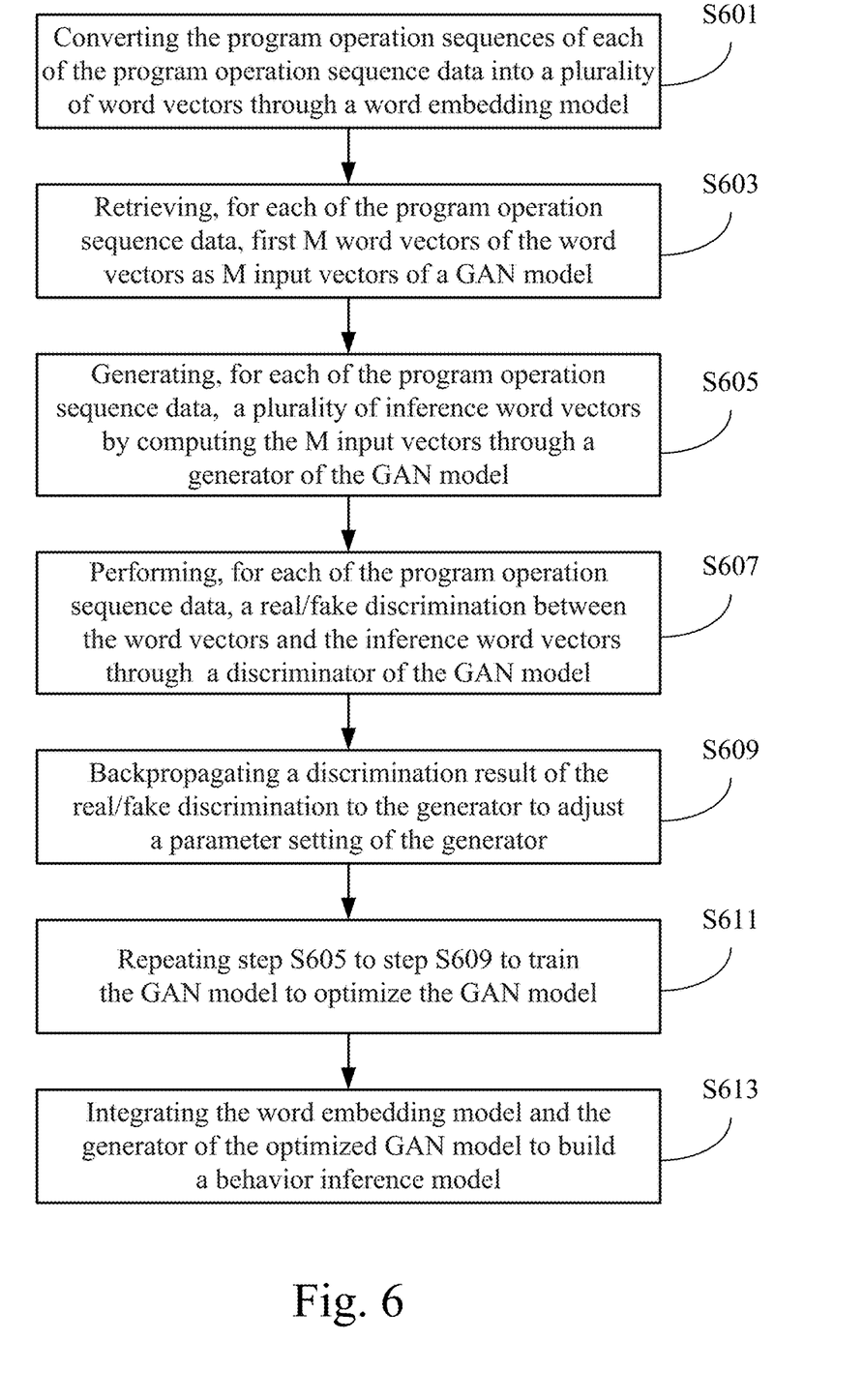
FIG. 6 is a flowchart diagram of a behavior inference model building method according to the present invention.

A third embodiment of the present invention is shown in FIG. 6, which is a flowchart diagram of a behavior inference model building method according to the present invention. The behavior inference model building method is for use in a behavior inference model building apparatus (e.g., the behavior inference model building apparatus 1 in the foregoing embodiment). The behavior inference model building apparatus comprises a storage and a processor. The storage stores a plurality of program operations sequence data. Each of the program operation sequence data recording a plurality of program operation sequences. The behavior inference model building method is executed by the processor.

First, step S601 is executed to convert the program operation sequences of each of the program operation sequence data into a plurality of word vectors (e.g., the word vectors WV shown in FIG. 2) through a word embedding model. Next, for each of the program operation sequence data, step S603 is executed to retrieve first M word vectors of the word vectors as M input vectors of a Generative Adversarial Network (GAN) model, where M is a positive integer.

For each of the program operation sequence data, step S605 is executed to generate a plurality of inference word vectors (e.g., the inference word vectors PWV shown in FIG. 2) by computing the M input vectors through a generator of the GAN model. Then, for each of the program operation sequence data, step S607 is executed to perform a real/fake discrimination between the word vectors and the inference word vectors through a discriminator of the GAN model. Afterwards, step S609 is executed to backpropagate a discrimination result of the real/fake discrimination to the generator to adjust a parameter setting of the generator.

In step S611, step S605 to step S609 are executed repeatedly to train the GAN model to optimize the GAN model. As described in the first embodiment, the generator and the discriminator will adjust the related parameter settings after receiving the discrimination result and re-generating the inference word vectors. Finally, step S613 is executed to integrate the word embedding model and the generator of the optimized GAN model to build a behavior inference model.

In other embodiments, the program operation sequence is a dynamic program operation sequence, which may be an Application Programming Interface (API) sequence or a system call sequence. In an embodiment, the dynamic programming sequence is retrieved by a tracking program. In other embodiments, the word embedding model is one of a word-to-vector (Word2Vec) model and a One-Hot Encoding model.

In addition to the above steps, the behavior inference model building method in this embodiment can also execute all the steps described in the foregoing embodiments and have all the corresponding functions. Those of ordinary skill in the art can directly understand how this embodiment performs these operations and has these functions based on the foregoing embodiments, so details will not be further described herein.

Figure 7:
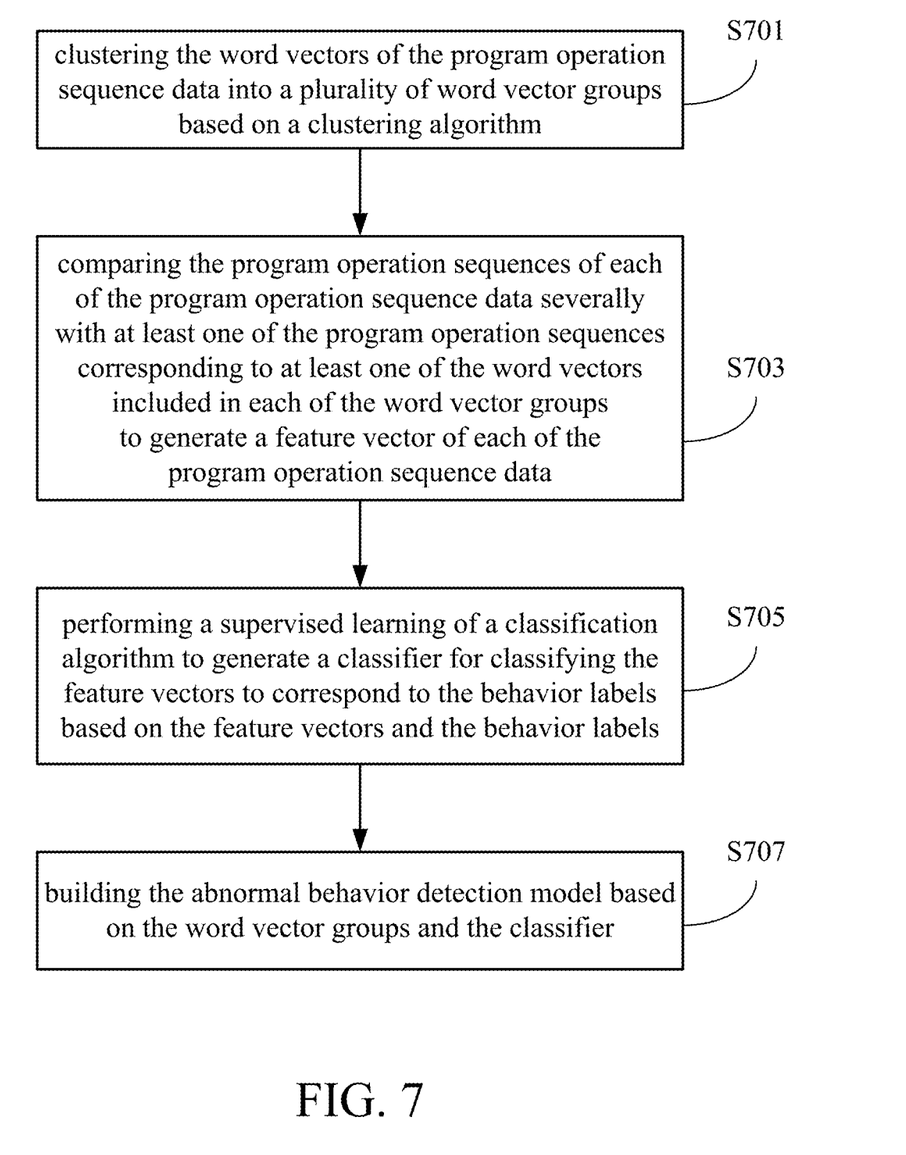
FIG. 7 is a flowchart diagram of building an abnormal behavior detection model in a behavior inference model building method according to the present invention.

A fourth embodiment of the present invention is shown in FIG. 7. The fourth embodiment is an extension of the third embodiment. In this embodiment, step S613 further comprises: integrating an abnormal behavior detection model, the word embedding model and the generator of the optimized GAN model to build the behavior inference model. FIG. 7 is a flowchart diagram of building an abnormal behavior detection model according to the present invention.

Step S701 is executed to cluster the word vectors of the program operation sequence data into a plurality of word vector groups based on a clustering algorithm. Next, step 703 is executed to compare the program operation sequences of each of the program operation sequence data severally with at least one of the program operation sequences corresponding to at least one of the word vectors included in each of the word vector groups to generate a feature vector of each of the program operation sequence data.

Step 705 is executed to perform a supervised learning of a classification algorithm to generate a classifier for classifying the feature vectors to correspond to the behavior labels based on the feature vectors and the behavior labels. Finally, step 707 is executed to build the abnormal behavior detection model based on the word vector groups and the classifier.

In other embodiments, the clustering algorithm is one of an Affinity Propagation (AP) clustering algorithm, a Spectral clustering algorithm, a Fuzzy C-means (FCM) clustering algorithm Method, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm, and the classification algorithm is one of a Support Vector Machine (SVM) algorithm, a Decision Tree (DT) algorithm, a Bayes algorithm and a Nearest Neighbors (NN) algorithms.

In addition to the above steps, the behavior inference model building method in this embodiment can also execute all the steps described in the foregoing embodiments and have all the corresponding functions. Those of ordinary skill in the art can directly understand how this embodiment performs these operations and has these functions based on the foregoing embodiments, so details will not be further described herein.

In addition, the foregoing behavior inference model building method of the present invention may be implemented by a non-transitory computer readable medium. The non-transitory computer readable medium stores a computer program including a plurality of codes. After the computer program is loaded and installed in an electronic computing apparatus (e.g., the behavior inference model building apparatus 1), the codes comprised in the computer program are executed by the processor to execute the behavior inference model building method of the present invention. The non-transitory computer readable medium may be, for example, a read only memory (ROM), a flash memory, a floppy disk, a hard disk, a compact disk (CD), a universal serial bus (USB) disk, a magnetic tape, a database accessible to networks, or any storage media with the same function and well known to people skilled in this field.

According to the above descriptions, the present invention converts the program operation sequences into a plurality of word vectors through word embedding model, inputs the first M word vectors of the word vectors to the generator of the GAN model to generate a plurality of inference word vectors, performs a real/fake discrimination through the discriminator of the GAN model, and backpropagates the discrimination result to the generator to make the generator adjust parameter setting according to the discrimination result. Since the discriminator repeatedly performs the real/fake discrimination between the inference word vectors and the real word vectors and backpropagates the real/fake discrimination result to the generator, the generator can generate the inference word vectors which are much more similar to the real word vectors Therefore, the behavior inference model of the present invention can accurately infer the subsequent program operation sequences in the early execution period of an application to prevent the files on the computer from damaging and prevent the user's personal information from stealing.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A behavior inference model building apparatus, comprising:
   a storage, being configured to store a plurality of program operations sequence data, each of the program operation sequence data recording a plurality of program operation sequences; and
   a processor electrically connected to the storage, being configured to execute the following steps of:

(a) converting the program operation sequences of each of the program operation sequence data into a plurality of word vectors through a word embedding model;
(b) retrieving, for each of the program operation sequence data, first M word vectors of the word vectors as M input vectors of a Generative Adversarial Network (GAN) model f, M being a positive integer;
(c) generating, for each of the program operation sequence data, a plurality of inference word vectors by computing the M input vectors through a generator of the GAN model;
(d) performing, for each of the program operation sequence data, a real/fake discrimination between the word vectors and the inference word vectors through a discriminator of the GAN model;
(e) backpropagating a discrimination result of the real/fake discrimination to the generator to adjust a parameter setting of the generator;
(f) repeating the step (c) to the step (e) to train the GAN model to optimize the GAN model; and
(g) integrating the word embedding model and the generator of the optimized GAN model to build a behavior inference model.

2. The behavior inference model building apparatus of claim 1, wherein the program operation sequences are a dynamic program operation sequence.

3. The behavior inference model building apparatus of claim 2, wherein the dynamic program operation sequence is an Application Programming Interface (API) sequence.

4. The behavior inference model building apparatus of claim 2, wherein the dynamic program operation sequence is a system call sequence.

5. The behavior inference model building apparatus of claim 2, wherein the dynamic program operation sequence is retrieved by a tracking program.

6. The behavior inference model building apparatus of claim 1, wherein the word embedding model is one of a Word-to-Vector (Word2Vec) model and a One-Hot Encoding model.

7. The behavior inference model building apparatus of claim 1, wherein the program operation sequence data include a plurality of abnormal program operation sequence data, and each of the abnormal program operation sequence data is associated with a malicious program.

8. The behavior inference model building apparatus of claim 1, wherein the processor further integrates an abnormal behavior detection model, the word embedding model and the generator of the optimized GAN model to build the behavior inference model.

9. The behavior inference model building apparatus of claim 8, wherein the storage further stores a plurality of behavior labels, each of the program operation sequence data corresponding to one of the behavior labels, and the processor further executes the following steps of:
clustering the word vectors of the program operation sequence data into a plurality of word vector groups based on a clustering algorithm;
comparing the program operation sequences of each of the program operation sequence data severally with at least one of the program operation sequences corresponding to at least one of the word vectors included in each of the word vector groups to generate a feature vector of each of the program operation sequence data;
performing a supervised learning of a classification algorithm to generate a classifier for classifying the feature vectors to correspond to the behavior labels based on the feature vectors and the behavior labels; and
building the abnormal behavior detection model based on the word vector groups and the classifier.

10. The behavior inference model building apparatus of claim 9, wherein the clustering algorithm is one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm, and the classification algorithm is one of a Support Vector Machine (SVM) algorithm, a Decision Tree (DT) algorithm, a Bayes algorithm and a Nearest Neighbors (NN) algorithm.

11. A behavior inference model building method for a behavior inference model building apparatus, the behavior inference model building apparatus comprising a storage and a processor, the storage storing a plurality of program operations sequence data, each of the program operation sequence data recording a plurality of program operation sequences, the behavior inference model building method being executed by the processor and comprising:
(a) converting the program operation sequences of each of the program operation sequence data into a plurality of word vectors through a word embedding model;
(b) retrieving, for each of the program operation sequence data, first M word vectors of the word vectors as M input vectors of a Generative Adversarial Network (GAN) model, wherein M being a positive integer;
(c) generating, for each of the program operation sequence data, a plurality of inference word vectors by computing the M input vectors through a generator of the GAN model;
(d) performing, for each of the program operation sequence data, a real/fake discrimination between the word vectors and the inference word vectors through a discriminator of the GAN model;
(e) backpropagating a discrimination result of the real/fake discrimination to the generator to adjust a parameter setting of the generator;
(f) repeating the step (c) to the step (e) to train the GAN model to optimize the GAN model; and
(g) integrating the word embedding model and the generator of the optimized GAN model to build a behavior inference model.

12. The behavior inference model building method of claim 11, wherein the program operation sequences are a dynamic program operation sequence.

13. The behavior inference model building method of claim 12, wherein the dynamic program operation sequence is an Application Programing Interface (API) sequence.

14. The behavior inference model building method of CIaEm 12, wherein the dynamic program operation sequence is a system call sequence.

15. The behavior inference model building method of claim 12, wherein the dynamic program operation sequence is retrieved by a tracking program.

16. The behavior inference model building method of claim 11, wherein the word embedding model is one of a Word-to-Vector (Word2Vec) model and a One-Hot Encoding model.

17. The behavior inference model building method of claim 11, wherein the program operation sequence data include a plurality of abnormal program operation sequence data, and each of the abnormal program operation sequence data is associated with a malicious program.

18. The behavior inference model budding method of claim 11, wherein the processor further integrates an abnormal behavior detection model, the word embedding model and the generator of the optimized GAN model to build the behavior inference model.

19. The behavior inference model building method of claim 18, wherein the storage further stores a plurality of behavior labels, each of the program operation sequence data corresponding to one of the behavior labels, and the processor further executes the following steps of:
  clustering the word vectors of the program operation sequence data into a plurality of word vector groups based on a clustering algorithm;
  comparing the program operation sequences of each of the program operation sequence data severally with at least one of the program operation sequences corresponding to at least one of the word vectors included in each of the word vector groups to generate a feature vector of each of the program operation sequence data;
  performing a supervised learning of a classification algorithm to generate a classifier for classifying the feature vectors to correspond to the behavior labels based on the feature vectors and the behavior labels; and
  building the abnormal behavior detection model based on the word vector groups and the classifier.

20. The behavior inference model building method of claim 19, wherein the clustering algorithm is one of an Affinity Propagation (AP) clustering algorithm, a Spectral clustering algorithm, a Fuzzy C-means (FCM) clustering algorithm, an Iterative Self-Organizing Data Analysis Technique Algorithm (ISODATA) clustering algorithm, a K-means clustering algorithm, a Complete-Linkage (CL) clustering algorithm, a Single-Linkage (SL) clustering algorithm and a Ward's method clustering algorithm, and the classification algorithm is one of a Support Vector Machine (SVM) algorithm, a Decision Tree (DT) algorithm, a Bayes algorithm and a Nearest Neighbors (NN) algorithm.

* * * * *